United States Patent [19]

Schmidt

[11] Patent Number: 4,822,163
[45] Date of Patent: Apr. 18, 1989

[54] TRACKING VISION SENSOR

[75] Inventor: Richard Schmidt, Huntington, N.Y.

[73] Assignee: Robotic Vision Systems, Inc., Hauppauge, N.Y.

[21] Appl. No.: 879,203

[22] Filed: Jun. 26, 1986

[51] Int. Cl.$^4$ .................. G01C 3/00; G01C 5/00; G01C 3/08

[52] U.S. Cl. ............................... 356/1; 356/4; 356/5

[58] Field of Search ............... 356/1, 4, 5, 376, 152, 356/141

[56] References Cited

U.S. PATENT DOCUMENTS

| | | | |
|---|---|---|---|
| 4,218,138 | 8/1980 | Robertsson | 356/152 |
| 4,441,809 | 4/1984 | Dudley et al. | 356/4 |
| 4,494,874 | 1/1985 | DiMatteo et al. | 356/376 |
| 4,502,785 | 3/1985 | Truax | 356/1 |
| 4,529,316 | 7/1985 | DiMatteo | 356/1 |
| 4,594,001 | 6/1986 | DiMatteo et al. | 356/1 |

Primary Examiner—Stephen C. Buczinski
Assistant Examiner—Melissa L. Koltak
Attorney, Agent, or Firm—Max Fogiel

[57] ABSTRACT

An arrangement in which three-dimensional surface measurements are obtained by projecting a non-planar light beam on a surface and interpreting the image by triangulation. The non-planar beam makes it possible to determine its angle of incidence with the surface in an unambiguous manner, and allows surrounding a manufacturing process to provide continuous data when guiding the process around corners. A non-planar reflecting surface or other arrangement is used to generate the non-planar light beam from a planar light source. A flying spot of light may also be used. After the non-planar beam has been generated, it is projected upon the surface to be measured and forms there an intersection of the beam with the surface. Light reflected from the intersection is imaged from an angle different than the projected beam, and coordinates are generated of the surface intersection points illuminated by the projected beam based on the known angle of projection, known angle of imaging, and distance between projection source and imaging site.

8 Claims, 4 Drawing Sheets

TRACKING VISION SENSOR

BACKGROUND OF THE INVENTION

Vision guided robotic systems have been employing the principle of optical triangulation to measure surface points on objects to be worked on by a robot. In particular, one arrangement employs the projection of a plane of light that falls upon the object to be measured and forms a line of light on the object surface where the surface intersects the light plane. A TV camera views the line of light from a known angle away from the plane of light, and this forms the basis for computing the location of each point on the line relative to the camera/projector sensor. The TV camera provides a video output signal that is processed to provide these measurements.

In using a sensor of this type, mounted on a robot arm to guide the robot along an edge or seam on an object, it has been necessary to anticipate the sudden loss of measurement data when the corner of the edge is reached or the seam reaches an edge. Since data is only obtained when the plane of light intersects the surface, the data disappears when the plane is carried beyond the corner or edge. The robot is usually fitted with a tool, such as a welding gun, which is being guided by the vision data and which must trail the line of intersection to avoid interfering with the vision measurement. Thus, the tool still has some distance to travel when the guidance data is lost.

SUMMARY OF THE INVENTION

It is an object of the invention to overcome the prior art disadvantages. A more particular object is to provide an improved arrangement for 3-D optical measurement systems employing scanned light beams or planes. In keeping with this object, and with still others which will become apparent, one aspect of the invention resides in an arrangement for providing a beam of light that is not shaped as a plane. By projecting a beam of light that tends to partially surround the working tool from a vision sensor mounted on a robot arm for guidance, a greater amount of information becomes available to the guidance system than if the sensor projects a plane of light. When tracking along an edge, and a corner is reached, the portion of a non-planar light beam in the direction of travel will go beyond the corner and lose data while a portion of the beam will remain on the object surface providing continuous data around the corner and along the intersecting edge. This allows the guidance system to continue a smooth track around the corner, a very desirable capability. When the robot brings the tool around the corner, the attached vision sensor will gradually return to where the center of the light beam is again placed along the edge to be tracked. This enables continuous guidance data to be obtained without requiring any auxiliary mechanism to move the sensor relative to the end of the robot arm carrying the working tool and sensor.

A further benefit is derived from this arrangement in that it provides additional measurement information sufficient to enable the determination of one additional degree of freedom in the orientation of the sensor and the robot arm to which it may be attached. A sensor that projects a plane of light onto a flat surface can measure surface points and from these points the angle of the surface relative to the sensor can be determined for the angle contained within the plane (in-plane angle). The angle of the surface contained in a plane orthogonal to the light plane (cross-plane angle) cannot be determined. However, by projecting a light beam that does not lie wholly within a plane, this deficiency is eliminated.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

BRIEF DESCRIPTION OF THE DRAWINGS

FIG. 3b shows a plan view of FIG. 3a;

FIG. 4b shows a side view of FIG. 4a;

FIG. 5b is a side view of FIG. 5a; and

DESCRIPTION OF THE PREFERRED EMBODIMENT

Figure 1:
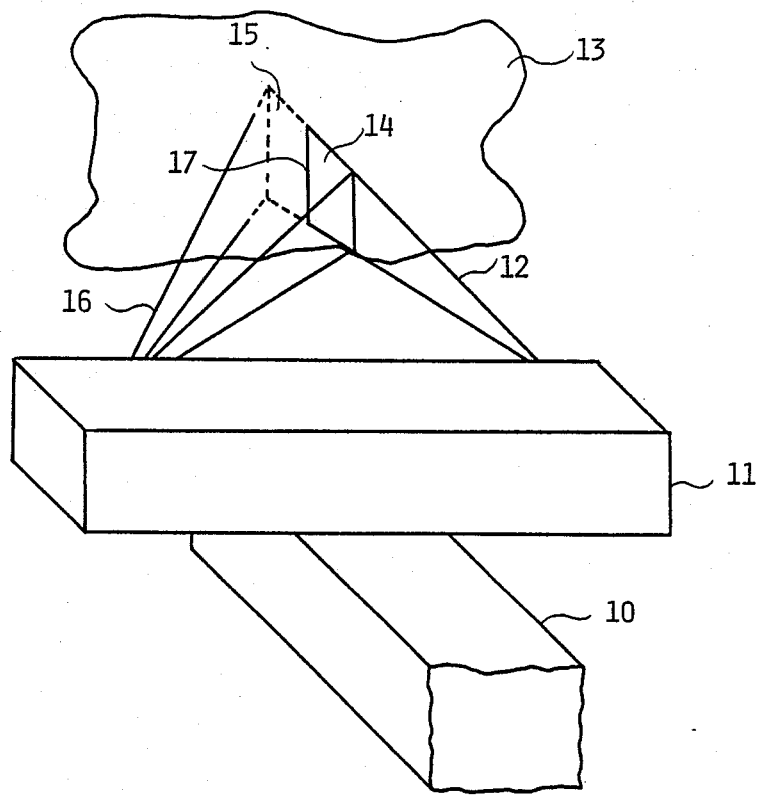
FIG. 1 is a perspective view and illustrates a prior art 3-D measurement sensor using optical triangulation, mounted on a robot arm and obtaining measurements from a surface.

The principles involved in making 3-D measurements with a projected light beam or plane (not restricted to the visible spectrum) and light sensitive detector are well described in U.S. Pat. No. 4,238,147. FIG. 1 illustrates a sensor 11 based on these principles and mounted on a robot arm 10 for the purpose of measuring how far surface 13 lies from the robot arm, orientation of the surface, relative to the arm, and location of features such as seams or edges. Sensor 11 projects a scanning beam or a plane of light 12 which is viewed along a portion of its length 14, 15 by a light-sensitive detector such as a TV camera within sensor 11 via path 16. With the separation between the projector and detector well known, and the angle of light projection and light detection known, the distance to surface 13 can be computed. In fact, the three spatial coordinates of every resolvable point along the intersection 17 of light plane 12 and surface 13 can be computed relative to sensor 11. From this data, the angle whereby sensor 11 views surface 13, as measured in the plane of light 12, can also be computed. On flat featureless surfaces four degrees of freedom of the surface relative to the sensor cannot be determined without scanning the sensor or surface in a controlled manner.

Figure 2A:
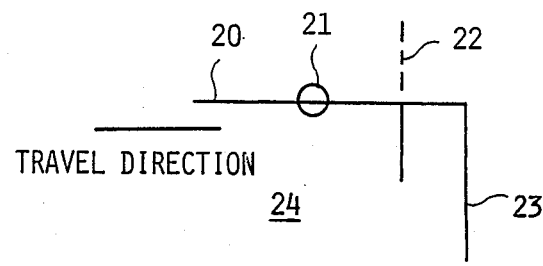
FIG. 2a shows the relationship between the prior art sensor light plane intersection line and tool work area.

FIG. 2a illustrates the intersection pattern 22 generated by a prior art sensor which projects a plane of light. Surface 24, having edges 20 and 23, represents, for example, the corner of a box to be welded along the edges. A vision sensor, as described above, can be attached to the arm of a welding robot to provide a means of sensing inexact placement of the box and variations in edge contour caused by normal manufacturing tolerances. The intersection pattern 22 would be placed forward of the weld arc 21 in the direction of travel. The portion of the light plane not intersecting the surface 24 is shown dashed. The pattern 22 is placed forward of arc 21 to avoid the interfering glare of arc 21 and to provide guidance signals to the robot in advance of bringing arc 21 to a point on edge 20. The robot needs signals in advance to enable it to accurately position arc 21. This is particularly true as the travel rates are increased and dynamic lag errors become significant.

Figure 2B:
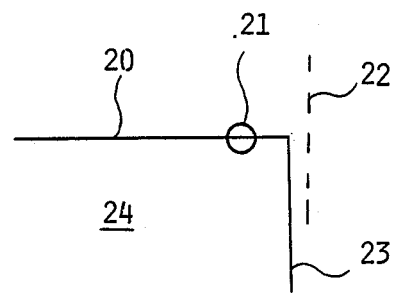
FIG. 2b shows the same relationship when a corner is encountered.

When a corner is encountered, a illustrated in FIG. 2b, the sensor of the prior art suddenly loses its ability to provide guidance data since the intersection pattern 22 reaches the end of edge 20 in advance of arc 21. The robot can then continue welding to the corner and swing out and around to bring pattern 22 onto edge 23, or the robot can attempt to blindly navigate the corner for a continuous weld from edge 20 to edge 23.

Figure 2C:
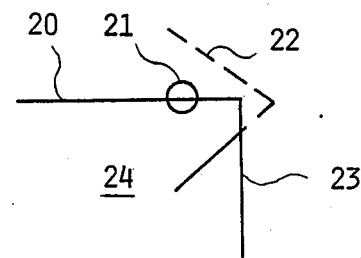
FIG. 2c shows the improved sensor relationship.

The condition that neither choice is completely satisfactory, has prompted the present invention, which replaces the projected plane of light 12 with a non-planar sheet of light. By bending the light plane around the working area, for example, as shown in FIG. 2c, where a "V"-shaped pattern 22 is projected upon surface 24—we obtain continuous data, even at the corner. As "V" pattern 22 travels along edge 20, data is obtained as in the prior art, and weld arc 21 can be properly guided. When a corner is encountered, pattern 22 continues to provide data on the newly encountered edge 23, regardless of whether it is to the left or right of edge 20. Thus, the weld arc 21 may be continuously guided around the corner and along the edge 23.

Figure 3A:
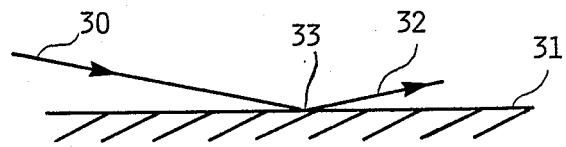
FIG. 3a shows in cross section a plane of light reflecting from a plane mirror.
Figure 3B:
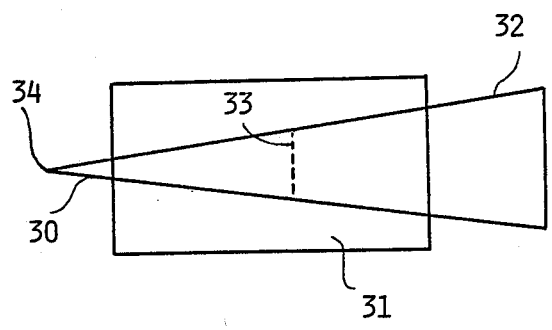

Although pattern 22 in FIG. 2c can be generated from two light sources, it is advantageous to use a single light source. FIG. 3a indicates in a side view how a plane of light 30 incident on surface 31, will reflect along path 32. FIG. 3b provides a plan view of this situation, with plane of light 30 emanating from light source 34 and reflecting along line of incidence 33 where surface 31 is a flat mirror-like surface. The reflected light beam 32 will be a plane if incident beam 30 is a plane.

Figure 3C:
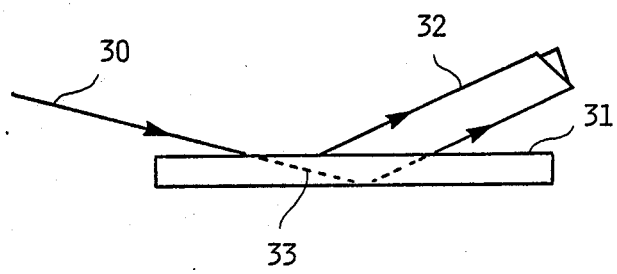
FIG. 3c shows in cross section a plane of light reflecting from a folded mirror.
Figure 3D:
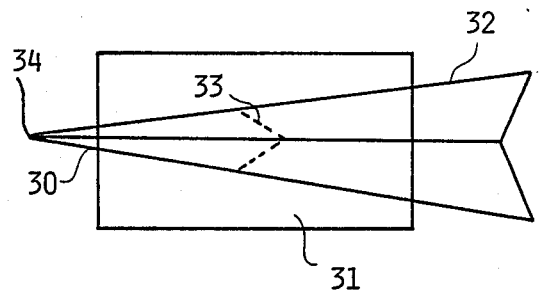
FIG. 3d shows a plan view of FIG. 3c.
Figure 3E:
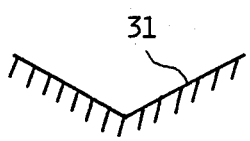
FIG. 3e shows an end view of the folded mirror.
Figure 3F:
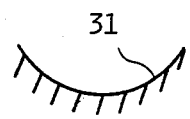
FIG. 3f shows an end view of a mirror with circular shape.

However, if surface 31 is "V"-shaped as shown in side view in FIG. 3c, in plan view in FIG. 3d, and in end view in FIG. 3e, then light from source 34 in the form of a plane 30 will form a "V"-shaped beam 32 after reflecting from surface 31 at line of incidence 33. If surface 31 is elliptical, then reflected beam 32 will have the form of a circular cylinder. Conversely, if surface 31 is a circular cylinder as shown in FIG. 3f which is an end view, the reflected beam 32 will have the shape of an elliptical cylinder. In similar manner other desirable shapes may be formed.

It should be noted that when a plane of light intersects a flat surface at an angle, the line of intersection is a straight line which yields no information about the angles formed by the surface and plane. However, when a "V"-shaped light beam or other non-planar beam intersects a flat surface, the line of intersection varies as the angle of the beam to surface varies, and this produces a unique measure of the in-plane and cross-plane angles. Further, when tracking along an edge such as 20 of FIG. 2c, these unique angles can be measured, even though only a part of the light pattern 22 intersects surface 24, provided that the part of pattern 22 intersecting surface 24 is not planar (e.g. elliptical or circular). This additional measurement value is obtained without resorting to two parallel light beams separated by a small distance that could potentially introduce ambiguity into the measurement if the reflected light cannot be correlated to the correct light beam.

The non-planar light beam may also be generated using conventional flying spot technology. A narrow pencil beam of light can be deflected over the non-planar path using mechanical or electronic deflection means.

Figure 4A:
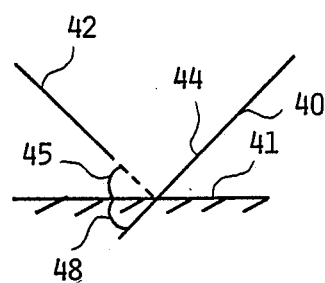
FIG. 4a shows an end view of a V-shaped light beam.
Figure 4B:
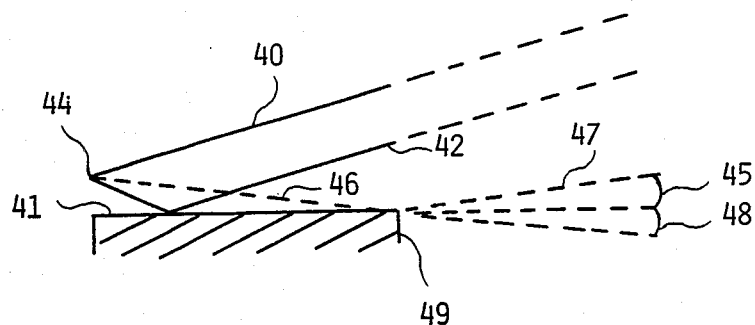

Alternately, a light plane derived from a point source can be formed into a non-planar beam as illustrated in FIGS. 4a and 4b. Point source 44 emits rays of light forming a plane of light 40 as seen in a side view in FIG. 4b, and in an end view in FIG. 4a. The rays within plane 40 striking reflecting surface 41 reflect and form plane 42. Planes 40 and 42 form a "V"-shaped light beam. In practical implementations surface 41 ends a significant distance from the target surface upon which the "V"-shaped beam is projected for making measurements. Also point source 44 must be located at least a small amount above surface 41 to avoid eclipsing some of the rays which are generally derived from an optical arrangement or to provide clearance for a physical light source. Therefore some rays coming from source 44 will not reflect from surface 41 even though they lie below a plane through source 44 and parallel to surface 41. For example, ray 46 will just miss surface 41 at end 49, and reach the target surface a distance 48 below the plane of surface 41. A ray slightly steeper than ray 46 will reflect along ray 47, and have a gap to the plane of surface 41 at the target of distance 45. Gap 45 is minimized by locating source 44 as close to surface 41 as practical.

Figure 5A:
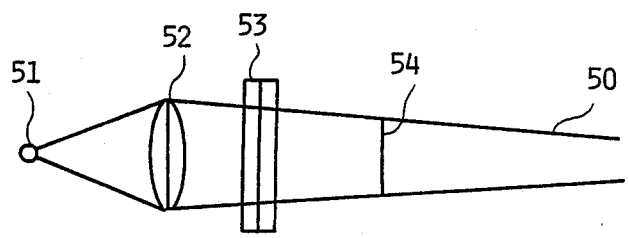
FIG. 5a is a plan view of optics forming a plane of light from a point source.
Figure 5B:
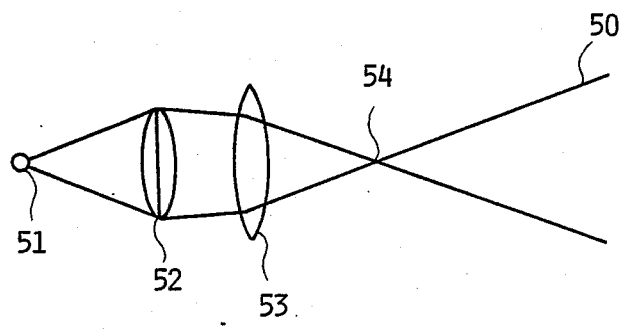
Figure 6:
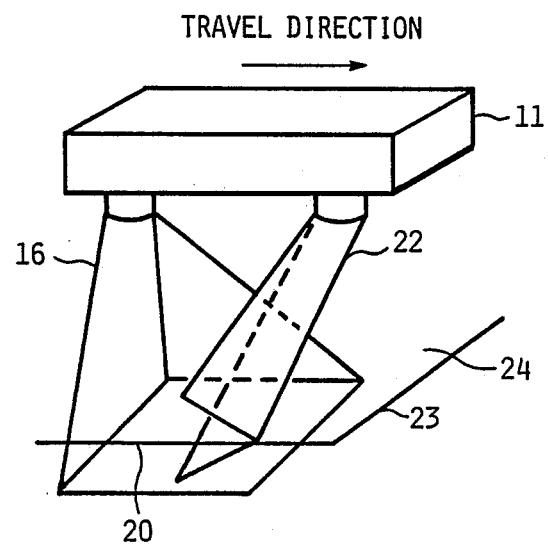
FIG. 6 is a perspective view and shows the use of a V-shaped light beam in accordance with the present invention.

FIGS. 5a and 5b show an arrangement for generating a line source of light that may be used as the point source of light 44. FIG. 5b shows a side view of the system with point light source 51 emitting light that is collected by spherical lens 52 which is positioned to image the point source at the target surface. FIG. 5a shows a plan view of the system. A cylindrical lens 53 focuses the rays into line 54. These rays then spread into a vertical fan beam 50.

In using a line source 54 for point source 44, the length of line 54 must be kept short to obtain a small gap 45 at the target surface. Since line 54 is perpendicular to plane 50 (40 in FIG. 4), at least part of the line will be separated substantially from surface 41 and cause a gap 45. However, the gap 45 may not be of great importance in some applications.

The invention has been described and illustrated with reference to an exemplary embodiment. It is not to be considered limited thereto, inasmuch as all modifications and variations which might offer themselves are intended to be encompassed within the scope of the appended claims.

What is claimed is:
1. A method for carrying out non-coplanar 3-D measurements of surface points, comprising the steps of: forming light from a light source into a plane of light; reshaping said plane of light into a non-planar beam;

projecting from a projection source said non-planar beam upon a surface to be measured and forming an intersection of said beam with said surface; imaging at an imaging site light reflected from said intersection from an angle different than said projected beam; and generating coordinates of said surface intersection points illuminated by said projected beam based on a known angle of projection, known angle of imaging and distance between projection source and imaging site.

2. A method of guiding a manufacturing process continuously around corners, comprising the steps of: measuring surface points at least partially surrounding the manufacturing process by forming light from a light source into a plane of light; reshaping said plane of light into a non-planar beam; projecting from a projection source said non-planar beam upon a surface to be measured and forming an intersection of said beam with said surface; imaging at an imaging site light reflected from said intersection from an angle different than said projected beam; generating coordinates of said surface intersection points illuminated by said projected beam based on a known angle of projection, known angle of imaging and distance between projection source and imaging site; directing said process to proceed on the basis of said measured points; and maintaining required orientation of said projected beam to follow contours of said surface.

3. A method of obtaining the angle of incidence of a light beam with a surface, comprising the steps of: measuring points on a surface by forming light from a light source into a plane of light; reshaping said plane of light into a non-planar beam; projecting from a projection source said non-planar beam upon a surface to be measured and forming an intersection of said beam with said surface; imaging at an imaging site light reflected from said intersection from an angle different than said projected beam; generating coordinates of said surface intersection points illuminated by said projected beam based on a known angle of projection, known angle of imaging and distance between projection source and imaging site; and computing the angle of incidence of said projected beam from said measured points.

4. A method defined in claim 1, wherein said plane of light is effectively generated by a flying spot.

5. A method as defined in claim 1, wherein said plane of light is reshaped by a "V"-shaped reflecting surface.

6. A method as defined in claim 1, wherein said plane of light is reshaped by a cylindrical reflecting surface.

7. A method as defined in claim 1, wherein said plane of light derives from a point source and is reshaped into a "V"-shape by a flat reflecting surface.

8. A method as defined in claim 1, wherein said non-planar beam is effectively generated directly by a flying spot.

* * * * *